UNITED STATES PATENT OFFICE.

JOHN BUXBAUM, OF GEORGETOWN, WASHINGTON.

PROCESS OF MANUFACTURING GUNPOWDER.

1,293,326.  Specification of Letters Patent.  Patented Feb. 4, 1919.

No Drawing.  Application filed December 28, 1917.  Serial No. 209,268.

*To all whom it may concern:*

Be it known that I, JOHN BUXBAUM, a citizen of the United States, residing at Georgetown, in the county of King and State of Washington, have invented certain new and useful Improvements in Processes of Manufacturing Gunpowder, of which the following is a specification.

This invention relates to improvements in the process of manufacturing gun powder and has for its principal object to provide an improved gun powder.

Other objects will appear as my invention is more fully explained in the following specification and pointed out in the appended claims.

Applicant's process consists in first taking ordinary black gun powder; second, to saturate the powder with spirits of camphor. In the second step in the operation it is important that enough camphor be added to make the mixture pasty and not to reduce it completely to a fluid. Third, allow the powder to thoroughly dry. After the powder is thoroughly dry it may be rammed into a cartridge or if a muzzle loading gun is used, it is rammed lightly in the usual manner into the barrel of the gun. The black gun powder if used may be prepared by mechanically mixing potassium nitrate, sulfur and charcoal in about the following proportions by weight: Potassium nitrate 75 per cent., sulfur 10 per cent. and carbon in the form of charcoal 15 per cent. The above percentages may be varied slightly without materially affecting the production. The various steps in grinding the ingredients of the powder, mixing the said ingredients and forming the powder into granules is so well known that the steps will not be taken up here.

I claim:

1. A process for the manufacturing of powder which embodies mechanically mixing black gun powder with spirits of camphor into a plastic mass and thoroughly drying the plastic mass.

2. A process which comprises mixing potassium nitrate, carbon and sulfur in approximately 75%, 15% and 10% respectively by weight, mechanically mixing the resultant powder with sufficient spirits of camphor to make a plastic mass, thoroughly drying the mixture and forming it into granules.

3. An explosive powder composed of potassium nitrate, 75 per cent., carbon, 15 per cent. and sulfur 10 per cent. by weight and sufficient spirits of camphor to form a plastic mass.

In testimony whereof I affix my signature.

JOHN BUXBAUM.